Patented Mar. 27, 1934

1,952,677

UNITED STATES PATENT OFFICE 1,952,677

VAT DYESTUFFS OF THE DIBENZOPYRENE-QUINONE SERIES

Max Albert Kunz, Mannheim, and Karl Koeberle, Ludwigshafen - on - the - Rhine, Germany, assignors to General Aniline Works, Inc., New York, N. Y., a corporation of Delaware No Drawing. Application March 20, 1930, Serial No. 437,596. In Germany March 26, 1929

10 Claims. (Cl. 260—61)

The present invention relates to the production of halogenated 3.4.8.9-dibenzopyrene-5.10-quinones.

In the application Ser. No. 355,654, filed April 16th, 1929, a process for the manufacture of halogenated 3.4.8.9-dibenzopyrene-5.10-quinones is described which comprises treating 3.4.8.9-dibenzopyrene-5.10-quinones in sulphuric acid solution in the presence of a halogen-transferring catalyst under restricted conditions which conditions comprise temperature, amount and kind of catalyst, the specific sulphuric acid employed, and the like, the said conditions being particularly set forth in the said application.

We have now found that halogenated 3.4.8.9-dibenzopyrene-5.10-quinones different from those already described are obtained by treating 3.4.8.9-dibenzopyrene-5.10-quinone or its derivatives in an inorganic acid medium in the absence of halogen-transferring catalyst with halogenating agents which expression is to be understood as also comprising free halogen. The term inorganic acid medium is meant to comprise inorganic oxygen acids, such as for example sulphuric acid and its derivatives, such as oleum, chlorosulphonic acid and persulphuric acid, phosphoric acid, perchloric acid and the like, and halides of metals and metalloids, for example iron chloride, to which other metal halides, for instance sodium chloride, may be added to lower their melting point. Halides of metalloids which may be used are for example phosphorus pentachloride and phosphorus oxychloride. Particularly useful solvents of the aforesaid kind are sulphuric acid and its derivatives. The halogenation is best carried out at temperatures below 100° C. The employment of sulphuric acid containing sulphur trioxide, preferably between about 5 and 23 per cent, is of particular advantage in our process and temperatures between about 40° and 70° C. are preferably employed. As has already been pointed out the products obtained according to our invention differ from those already described and this difference will be more fully set forth with respect to a dibromo derivative. By brominating 3.4.8.9-dibenzopyrene-5.10-quinone in sulphuric acid containing 23 per cent of sulphuric trioxide at between 60° and 65° centigrade a dibromo derivative is obtained which though it contains the same amount of bromine as the product obtained by brominating 3.4.8.9-dibenzopyrene-5.10-quinone in chlorosulphonic acid at between 60° and 80° centigrade in the presence of two or more per cent of iodine, dyes cotton substantially more yellowish shades which can scarcely be distinguished from those obtained from the unhalogenated initial material. It, however, shows the advantage over the unhalogenated initial material of a greater strength and better fastness properties as regards washing and boiling. The difference between the said two dibromo derivatives is probably due to the different position of the bromine atoms in the molecule. The new dyestuffs dissolve in concentrated sulphuric acid giving violet to blue solutions and dye cotton yellow shades from, generally speaking, red to violet vats. They may be purified according to methods already known or separated from small amounts of isomeric products.

When working in oleum of a high percentage strength the halogenation can usually be carried out with the amount of halogen corresponding to as many atomic proportions thereof as halogen atoms are to be introduced into each molecule of the initial material.

Derivatives containing different halogens such as chlorobromo derivatives can also be obtained in the aforesaid manner.

The halogenated 3.4.8.9-dibenzopyrene-5.10-quinones containing only small amounts of halogen prepared according to the application Ser. No. 355,654 in the presence of halogen-transferring catalysts may be further halogenated according to the process of the present invention or small amounts of halogen may first be introduced into dibenzopyrene-quinones in the absence of halogen transferring catalysts, the products being then further halogenated after the addition of such catalysts.

The products are dyestuffs themselves and valuable intermediate products for the preparation of new vat dyestuffs.

The products obtained according to the present application correspond to the formula

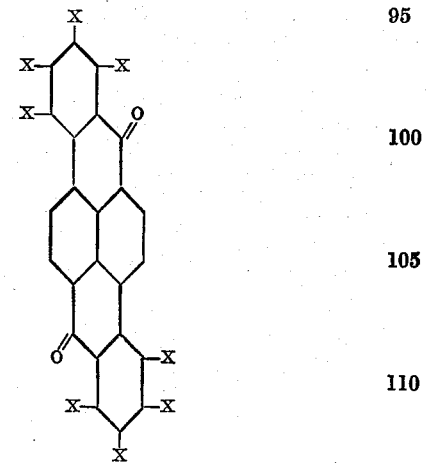

in which at least one X stands for a halogen atom while the remaining letters X stand for hydrogen.

The following examples will further illustrate the nature of this invention but the invention is not restricted to these examples. The parts are by weight.

Example 1

33.2 parts of pure 3.4.8.9-dibenzopyrene-5.10-quinone obtainable by crystallization from organic solvents are dissolved in 300 parts of 23 per cent oleum while stirring, and 20 parts of bromine are then added and the temperature is slowly raised to between 65° and 70° centigrade which temperature is maintained until all of the bromine has been consumed. The reaction mixture is then allowed to cool, diluted, if desired, with 150 parts of concentrated sulphuric acid, poured into water, boiled up for a short time and filtered by suction. The dibromo-3.4.8.9-dibenzopyrene-5.10-quinone obtained is an orange paste, and an orange yellow powder when dried, and dissolves in concentrated sulphuric acid to give a violet solution and furnishes on cotton from a blue red vat clear orange yellow shades substantially surpassing those obtained from the unhalogenated initial material as regards strength and fastness against washing.

The crude product containing small amounts of the isomeric product dyeing yellow shades with a reddish tinge, may be purified by the usual methods. It crystallizes from nitro-benzene in orange coloured needles. The product obtained in accordance with the aforesaid mode of working possesses almost with certainty the two bromine atoms in the positions indicated in the following formula:

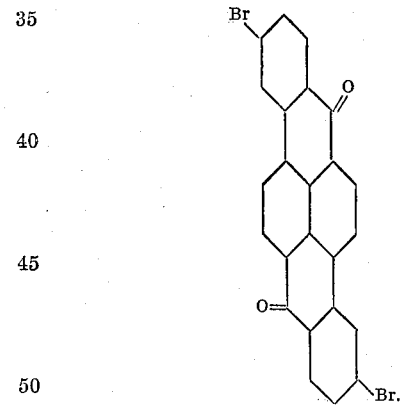

A tribromo derivative is obtained by the employment of larger amounts of bromine, the said product showing similar tinctorial properties to the above described dibromo-derivative.

Example 2

33.2 parts of 3.4.8.9-dibenzopyrene-5.10-quinone are dissolved in 300 parts of oleum of 12 per cent strength, the solution being then slowly heated after the addition of 8.8 parts of bromine to between 60° and 70° centigrade, while stirring. When all of the bromine has been taken up, the reaction mixture is allowed to cool and worked up as described in the foregoing example. The monobromo-3.4.8.9-dibenzopyrene-5.10-quinone obtained is a yellow orange paste, and a yellow orange powder when dried. It dissolves in concentrated sulphuric acid to give a red violet solution, furnishes a red vat and dyes cotton clear strong golden yellow shades.

Example 3

3.3 parts of pure 3.4.8.9-dibenzopyrene-5.10-quinone obtainable by sublimation are dissolved in 30 parts of 23 per cent oleum and warmed, while stirring, to between 65° and 70° centigrade, while introducing a current of dry chlorine until a sample dissolves in concentrated sulphuric acid to give a violet solution. The reaction mixture is then allowed to cool and worked up in the usual way. The reaction product dyes cotton from a red vat clear golden yellow shades of very good fastness.

Example 4

37 parts of the monochloro-3.4.8.9-dibenzopyrene-5.10-quinone obtainable by passing chlorine into a solution of 3.4.8.9-dibenzopyrene-5.10-quinone in chlorsulphonic acid to which iodine has been added, are dissolved in 400 parts of 23 per cent oleum. 16 parts of bromine are added to the said solution, the temperature being then raised to between 65° and 70° centigrade, while stirring, and kept thereat until the bulk of the bromine has been consumed. The reaction mixture is then allowed to cool, and worked up in the usual manner. The dyestuff obtained, a chlorobromo-3.4.8.9-dibenzopyrene-5.10-quinone, dissolves in concentrated sulphuric acid to give a blue solution with a violet tinge and dyes cotton from a blue red vat clear strong orange yellow shades of excellent fastness.

Example 5

33.2 parts of 3.4.8.9-dibenzopyrene-5.10-quinone are dissolved in 23 per cent oleum, 20 parts of bromine being then added to the said solution which is warmed to between 80° and 85° centigrade, while stirring, the reaction mixture being kept at the said temperature until all of the bromine has been taken up. The reaction mixture is then allowed to cool, diluted if desired with concentrated sulphuric acid, poured into water and worked up in the usual manner. The dibromo derivative obtained dissolves in concentrated sulphuric acid to give a blue violet solution and dyes cotton clear strong very fast golden yellow shades from a blue red vat.

When passing between about 4 to 5 parts of dry chlorine into the reaction mixture after the bromine has been taken up, a chloro-dibromo-derivative is obtained which dyes more greenish shades than the above described reaction product, the other properties being equal.

The introduction of the said two halogens may also be performed in the inverse order.

Example 6

33.2 parts of 3.4.8.9-dibenzopyrene-5.10-quinone are dissolved while stirring in 250 parts of oleum containing 18 per cent sulphur trioxide, the mixture being then heated to between 90° and 95° C. after the addition of 16 parts of bromine. The reaction mixture is kept at the same temperature until all of the bromine has been taken up, is then allowed to cool, diluted with sulphuric acid, poured into water and the separated reaction product filtered off. It is a dibromo-3.4.8.9-dibenzopyrene-5.10-quinone according to analysis and has similar tinctorial properties to the reaction product described in Example 1.

A reaction product containing chlorine and bromine is obtained in an analogous manner by introducing chlorine into the reaction mixture before brominating in the aforesaid manner. The same product may also be obtained by first brominating and then chlorinating.

Example 7

33.2 parts of pure 3.4.8.9-dibenzopyrene-5.10-quinone obtainable by sublimation of crude dibenzopyrenequinone are dissolved in 300 parts of sulphuric acid monohydrate and warmed after the addition of 24 parts of bromine for several hours at between 80° and 90° C. In order to complete the reaction, the mixture is warmed for a short time at between 120° and 125° C., allowed to cool, poured into water and the reaction product filtered off. The bromo-3.4.8.9-dibenzopyrene-5.10-quinone thus obtained has similar properties to that described in Example 1.

A mixture of sulphuric acid monohydrate and chlorosulphonic acid may be used instead of sulphuric acid monohydrate alone. The halogenation may also be carried out in phosphorous oxychloride or a mixture of phosphorus oxychloride and phosphorus pentachloride.

*Example 8*

33 parts of 3.4.8.9-dibenzopyrene-5.10-quinone are introduced into a melt of 200 parts of iron chloride and 30 parts of sodium chloride. 25 parts of bromine are then added at between 75° and 80° C., the reaction mixture being stirred for several hours at between 80° and 85° C. The melt is then poured into dilute acid and the reaction product filtered off. The chlorobromo-3.4.8.9-dibenzopyrene-5.10-quinone thus obtained dissolves in concentrated sulphuric acid to give a blue violet solution and dyes the vegetable fibre from a blue red vat clear strong golden yellow shades.

*Example 9*

16.6 parts of pure 3.4.8.9-dibenzopyrene-5.10-quinone are dissolved in 200 parts of chlorosulphonic acid and slowly heated to between 95° and 100° C. after the addition of 16 parts of bromine. As soon as a sample dissolves in sulphuric acid to give a violet blue solution the reaction mixture is allowed to cool and worked up as usual. The reaction product, a monobromo derivative according to analysis dyes cotton from a red vat fast golden yellow shades.

What we claim is:—

1. A process of producing halogenated 3.4.8.9-dibenzo-pyrene-5.10-quinones dyeing cotton more intensely and having a stronger affinity to the said material than the corresponding dibenzopyrene quinones free from halogen which comprises treating a 3.4.8.9-dibenzopyrene-5.10-quinone in an inorganic acid medium with a halogenating agent in the absence of a halogen-transferring catalyst.

2. A process of producing halogenated 3.4.8.9-dibenzopyrene-5.10-quinones dyeing cotton more intensely and having a stronger affinity to the said material than the corresponding dibenzopyrene quinones free from halogen which comprises treating a 3.4.8.9-dibenzopyrene-5.10-quinone in sulphuric acid with a halogenating agent in the absence of a halogen-transferring catalyst.

3. A process of producing halogenated 3.4.8.9-dibenzopyrene-5.10-quinones dyeing cotton more intensely and having a stronger affinity to the said material than the corresponding dibenzopyrene quinones free from halogen which comprises treating a 3.4.8.9-dibenzopyrene-5.10-quinone in sulphuric acid at a temperature below 100° C. with a halogenating agent in the absence of a halogen-transferring agent.

4. A process of producing halogenated 3.4.8.9-dibenzopyrene-5.10-quinones dyeing cotton more intensely and having a stronger affinity to the said material than the corresponding dibenzopyrene quinones free from halogen which comprises treating a 3.4.8.9-dibenzo-pyrene-5.10-quinone in oleum at a temperature between about 40° and 70° C. with a halogenating agent in the absence of a halogen-transferring agent.

5. A process of producing halogenated 3.4.8.9-dibenzopyrene-5.10-quinone dyeing cotton more intensely and having a stronger affinity to the said material than the corresponding dibenzopyrene quinones free from halogen which comprises treating a 3.4.8.9-dibenzopyrene-5.10-quinone in oleum containing between about 5 and 23 per cent of sulphur trioxide with a halogenating agent in the absence of a halogen-transferring agent.

6. A process of producing halogenated 3.4.8.9-dibenzopyrene-5.10-quinones dyeing cotton more intensely and having a stronger affinity to the said material than the corresponding dibenzopyrene quinones free from halogen which comprises treating a 3.4.8.9-dibenzopyrene-5.10-quinone in an inorganic acid medium with bromine in the absence of a halogen-transferring catalyst.

7. A process of producing halogenated 3.4.8.9-dibenzopyrene-5.10-quinones dyeing cotton more intensely and having a stronger affinity to the said material than the corresponding dibenzopyrene quinones free from halogen which comprises treating a 3.4.8.9-dibenzopyrene-5.10-quinone in oleum at a temperature between about 40° and 70° C. with bromine in the absence of a halogen-transferring catalyst.

8. Dibromo-3.4.8.9-dibenzopyrene-5.10-quinone containing the bromine atoms in the benzo nuclei forming an orange powder, dissolving in concentrated sulphuric acid to give a violet solution and dyeing cotton clear orange shades which can scarcely be distinguished from those obtained from the unbrominated 3.4.8.9-dibenzopyrene-5.10-quinone but having a stronger coloring power and affinity to the cotton fibre.

9. Pure dibromo-3.4.8.9-dibenzopyrene-5.10-quinone containing the bromine atoms in the benzo nuclei forming an orange powder, dissolving in concentrated sulphuric acid to give a violet solution and dyeing cotton clear orange shades with a slightly more greenish tinge than those obtained from the unbrominated 3.4.8.9-dibenzopyrene-5.10-quinone but having a stronger coloring power and affinity to the cotton fibre.

10. Pure dibromo-3.4.8.9-dibenzopyrene-5.10-quinone corresponding to the formula

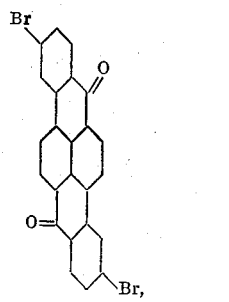

forming an orange powder, dissolving in concentrated sulphuric acid to give a violet solution and dyeing cotton clear orange shades with a slightly more greenish tinge than those obtained from the unbrominated 3.4.8.9 - dibenzopyrene-5.10-quinone.

MAX ALBERT KUNZ.
KARL KOEBERLE.